Aug. 20, 1940. J. R. HAGEMANN 2,212,471
SHAFT GLAND FOR HIGH TEMPERATURE STEAM TURBINES
Filed Oct. 1, 1938 2 Sheets-Sheet 1

Inventor
J. R. Hagemann
by
Attorney

Patented Aug. 20, 1940

2,212,471

UNITED STATES PATENT OFFICE 2,212,471

SHAFT GLAND FOR HIGH TEMPERATURE STEAM TURBINES

John R. Hagemann, Milwaukee, Wis., assignor to Allis-Chalmers Manufacturing Company, Milwaukee, Wis., a corporation of Delaware Application October 1, 1938, Serial No. 232,708

7 Claims. (Cl. 60—64)

This invention relates to cooling means for shaft glands of high temperature steam turbines, and particularly to a means and system for introducing comparatively low temperature steam into such shaft glands.

It is known that high temperatures are detrimental to lubricating oil used in steam turbines and may even be hazardous if the temperature should reach the flash point of the oil. In order to avoid this hazard, the oil lines are usually located on the side of the turbine opposite from the steam lines.

There is one place on the steam turbine, however, where high temperature steam is necessarily closely adjacent to lubricating oil. This is at the point of steam inlet to the turbine, usually at one end of the turbine, and therefore relatively close to the shaft bearing at that end of the turbine.

High temperature steam necessarily heats up the spindle of the turbine and the heat travels along the spindle and toward the bearing where it may carbonize the lubricating oil or even create a fire hazard.

It is an object of this invention to prevent transmission of heat along the spindle to the bearing by the introduction of relatively cool steam into the shaft gland thereof. It is another object of this invention to introduce such steam preferably from a point in the same turbine section or another turbine section of the same system, where such steam has already given up part of its energy in doing useful work. It is a further object of this invention to permit such cooling steam to flow axially along an appreciable portion of the spindle, thereby cooling the turbine spindle. It is a further object of this invention to provide a turbine construction wherein steam may be extracted adjacent the exhaust of the turbine, cooled and conducted to the shaft gland at the high pressure end of the turbine. It is a further object of this invention to provide a compound turbine system wherein cooling steam is automatically provided at the high pressure glands of the turbine. Other objects of the invention will become obvious from the specification and drawings attached hereto.

In the drawings illustrating preferred embodiments of this invention, Fig. 1 is a broken vertical sectional view of a steam turbine provided with shaft gland cooling means in accordance with this invention;

Figure 1:
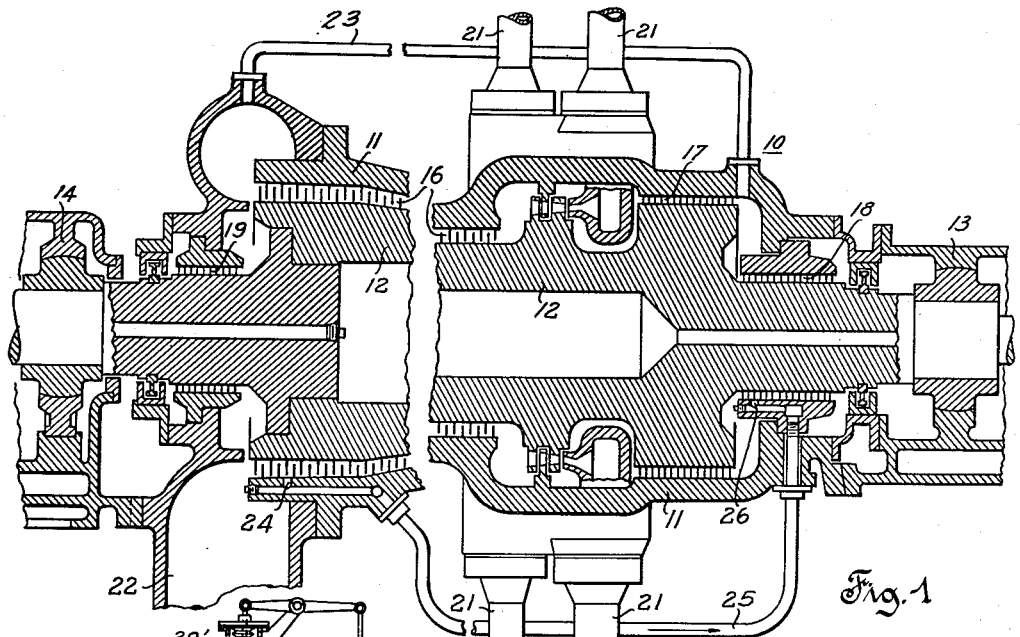

Referring to Fig. 1, 10 discloses an impulse reaction turbine of known construction. The casing 11 of the turbine encloses the spindle 12 which is supported on two bearings 13 and 14. The working area of the turbine is indicated at blading 16, while sealing means is provided at both sides of the working area, as at 17 and 18 on the high pressure side, and 19 on the low pressure side. Such sealing means may be the usual labyrinth seal of known construction. Steam may be introduced to the turbine through steam inlet 21, and, after passing through blading 16, may be exhausted at 22. Equalizing conduit 23 connects the exhaust end 22 of the turbine with the outer face of the balance piston, in accordance with standard practice. In accordance with this invention, the high pressure shaft gland 18 is cooled by means of steam extracted adjacent the exhaust end of the turbine at 24 and conducted through conduit 25 to a point 26 in the shaft gland at which, due to equalizing connection 23, the normal leakage steam pressure is lower than the pressure at point 24. It will be clear that the steam which is extracted at 24 will be of relatively low temperature since such steam had already done work in passing through the blading area of the turbine. This relatively cool steam which is introduced at point 26 flows in both directions therefrom. That part of the cooling steam which flows towards the center of the turbine and out through connection 23 adequately prevents the flow of comparatively hot sealing steam toward the bearing, while that part of the cooling steam which flows toward the bearing from point 26, being relatively cool, extracts heat from the spindle and cools the end of the spindle. In this way, transmission of heat from the spindle to the bearing 13 is largely restricted.

Figure 2:
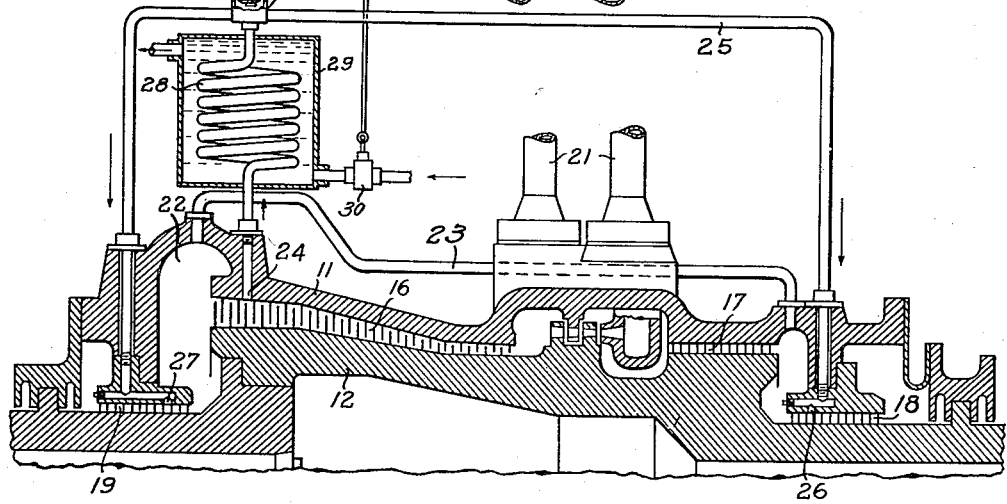
Fig. 2 is a fragmental sectional elevation view of a modified construction in which a cooling means is provided in the steam line leading to the shaft gland.

The construction shown in Fig. 2 is generally similar to that shown in Fig. 1. It is modified in two respects, however. In the first place, the steam extracted from adjacent the exhaust end of the turbine is conducted to both shaft glands, being introduced into the high pressure shaft gland at 26 and into the low pressure shaft gland 19 at 27. Secondly, the steam extracted from adjacent the exhaust end of the turbine is cooled by passing it through a heat exchanger 28 which is surrounded by casing 29 through which some cooling fluid, such as water, may be passed. This cools the steam being introduced to the shaft gland, making the structure even more effective to reduce transmission of heat along the spindle to the bearing.

Since the temperature of the steam extracted at 24 varies considerably, depending on the load on the turbine, it may be desirable to regulate the amount of cooling fluid passed through the heat exchanger. For this purpose, a valve 30 is provided for the cooling fluid inlet. In order to make this valve 30 operate automatically, it may be actuated by a thermostat 29' which is responsive to the temperature of the steam flowing through conduit 25. If the steam flowing through conduit 25 should become hotter due to a decrease in load on the turbine, the thermostat 29' would actuate valve 30 to increase the amount of cooling fluid flowing through heat exchanger 28. It is obvious that a cooling device may also be used in the modification of Fig. 1; and that other types of cooling devices, such as those commonly known as desuperheaters, may be used instead of the heat exchanger illustrated in Fig. 2.

Figure 3:
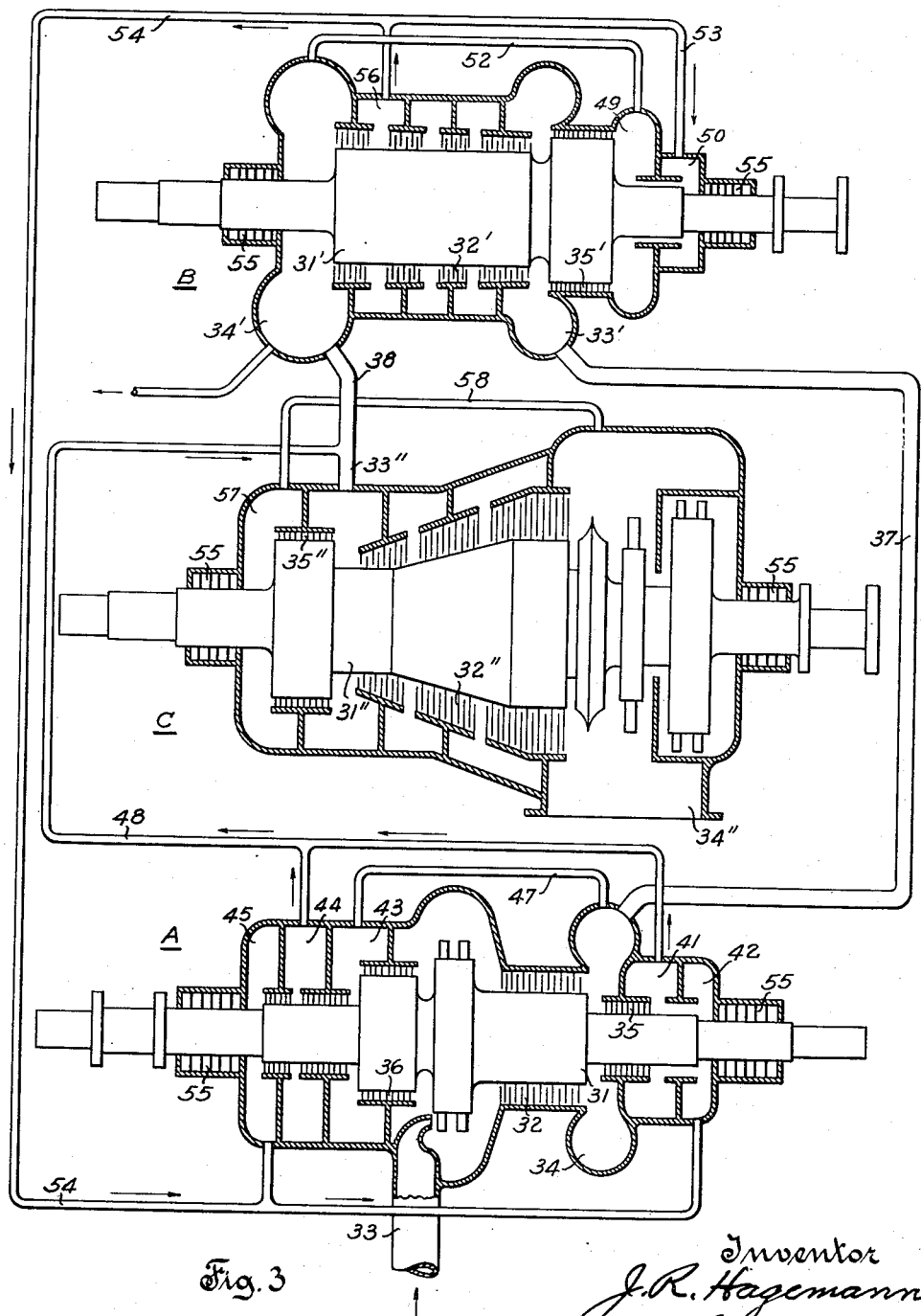
Fig. 3 is a diagrammatical view of a cross-compound turbine system arranged in accordance with this invention.

Application of this invention to a cross-compound turbine system is shown in Fig. 3 in which A is the high pressure turbine, B is the intermediate pressure turbine, while C is the low pressure turbine. While the disclosure relates to a marine propulsion system, it is clear that it is equally applicable to any other type of turbine. Turbines A, B and C comprise spindles 31, 31' and 31" provided with blading indicated at 32, 32' and 32" and supported at bearings on the ends, not shown. Steam is introduced to the turbines at 33, 33' and 33" and exhausted at 34, 34' and 34", respectively. Sealing means for the spindles are shown at 35, 35' and 35" and at 36. High pressure steam is introduced to the high pressure turbine at 33, which exhausts through conduit 37 into the intermediate pressure turbine at 33'. The exhaust from the intermediate pressure turbine at 34' flows into low pressure turbine through connection 38 which may exhaust to a condenser or atmosphere at 34".

It will be noted that the low pressure gland of the high pressure turbine is divided into two compartments 41 and 42, while the high pressure gland of the same turbine is divided into three compartments 43, 44 and 45. Compartment 43 is connected with the exhaust of the high pressure turbine by means of equalizing conduit 47. Compartments 41 and 44 of the high pressure turbine are connected by conduit 48 with the connection 38 between the intermediate and low pressure turbines. The high pressure gland of the intermediate pressure turbine is divided into compartments 49 and 50. Steam is extracted adjacent the exhaust end of the intermediate pressure turbine at 56 and is conducted to shaft gland compartment 50 by means of pipe 53 and to the end compartments 42 and 45 of the high pressure turbine by means of conduit 54. Intermediate compartment 49 of the intermediate pressure turbine is connected by equalizing conduit 52 with the exhaust end of this turbine. An equalizing conduit 58 is also shown connecting the exhaust end of the low pressure turbine to compartment 57 of its shaft gland. Packings 55 are shown on either end of all the turbine shafts inward of the bearings thereof.

The connection of compartment 41 and 44 of the high pressure turbine with the exhaust end of the intermediate pressure turbine provides that the pressure within the compartments 41 and 44 shall be lower than the pressure in the outer compartments 42 and 45 which are connected to the intermediate pressure turbine at a point 56 at which the pressure is higher than at the exhaust thereof. The leakage steam flowing from the working area of the high pressure turbine to compartments 43 and 44, having done no work, is at a comparatively high temperature. On the other hand, steam which is extracted at point 56 of the intermediate pressure turbine, having flowed through the working area of the high pressure turbine and most of the intermediate pressure turbine, has done considerable work and its temperature is accordingly considerably reduced. The introduction of this low temperature high pressure steam into compartments 42 and 45 results in the flow of the relatively cool steam through the intervening sealing means into compartments 41 and 44, respectively. Furthermore, the relatively cool steam in compartments 42 and 45 serves to abstract heat from spindle 31, thereby keeping the bearings at the ends of the spindle comparatively cool. While Fig. 3 is a diagrammatic showing, it is clear that the glands may be of the construction shown in Figs. 1 and 2.

In the intermediate pressure turbine the compartment 49 is at a comparatively low pressure due to its connection, through equalizing conduit 52, with the exhaust end of the turbine. Compartment 50 is maintained at a higher pressure by means of its connection 53 with the extraction point 56. Cooling steam will therefore flow from compartment 50 through the shaft gland packing to compartment 49, cooling the spindle as it flows axially in contact therewith. It will be seen that the arrangement is such that both shaft glands of the high pressure turbine and the high pressure shaft gland of the intermediate pressure turbine are divided into two or more compartments. The inner of said two compartments, such as 41, 44 and 49, is connected to a point in the system which will assure that the pressure in the inner compartment will be lower than the pressure in the outer compartment 42, 45 and 50, due to the connection of these outer compartments with a point in the working area of the turbine system at which the pressure is higher than the point to which the inner compartments are connected. This assures the flow of cooling steam from the outer to the inner compartments along the spindle, cooling the spindle and reducing transmission of heat along the spindle to the bearing.

While maintenance of oil at a safe and non-carbonizing temperature has been mentioned as being one of the chief advantages of the present invention, other advantages of importance also result therefrom. Prevention of overheating of the spindle also simplifies the problem of maintaining the clearances within the turbine, particularly where a thermostatically controlled cooling means, such as is indicated in Fig. 2, is utilized. Other advantages, such as avoidance of high temperature distortion, will readily occur to those familiar with the operation of high temperature turbines.

It will be understood that while steam and steam turbines are mentioned through the specification and claims, the word "steam" shall be deemed to be the equivalent of any other expansible fluid, such as gas or mercury vapor.

The constructions described herein are merely for the purpose of illustration. Numerous modifications and equivalents will occur to those skilled in the art.

It is claimed and desired to secure by Letters Patent:

1. A high temperature steam turbine comprising a spindle supported on lubricated bearings, blading carried by said spindle and subject to high temperature steam, means for introducing steam to said blading, means for conducting steam from said blading, sealing means for said steam between said blading and said bearings, an equalizing connection between the exhaust end of said turbine and an intermediate portion of said sealing means, means for cooling said spindle adjacent at least one of said bearings comprising a conduit from a point in the blading near the exhaust end thereof at which the pressure is higher than the pressure in said equalizing conduit to a point in the sealing means near said last named bearing at which the normal leakage steam pressure is lower than at said point in the blading, whereby leakage of high temperature steam toward said bearing is prevented by flow of steam from said last named point in said sealing means toward said intermediate point, and the temperature of the spindle adjacent said bearing is reduced.

2. A high temperature steam turbine as recited in claim 1, wherein said conduit is provided with means for cooling the steam passing therethrough.

3. A high temperature steam turbine as recited in claim 1, wherein said conduit is provided with means responsive to the temperature of steam passing therethrough for cooling said steam.

4. A turbine system comprising a high pressure turbine, a low pressure turbine, and means for conducting steam through said turbines in series, each of said turbines comprising a rotatable spindle supported on bearings, steam blading and steam sealing means along said spindle between said blading and said bearings, means connecting the exhaust end of said low pressure turbine to an intermediate portion of said high pressure turbine sealing means, and means for conducting steam from a point in the blading near the exhaust of said low pressure turbine at which the pressure is higher than that at the exhaust end of said low pressure turbine to a point in said sealing means at the high pressure end of the high pressure turbine located between said intermediate point and the bearing at the high pressure end of the high pressure turbine, whereby leakage of high temperature steam toward said bearing is prevented by flow of steam from said blading near the exhaust of said low pressure turbine along the sealing means toward said intermediate point thereof.

5. A turbine system as recited in claim 4, wherein said conducting means is connected to conduct said steam to the outer portions of the sealing means at both ends of the high pressure turbine.

6. A turbine system as recited in claim 4, wherein said conducting means is connected to conduct said steam to the outer portions of the sealing means at both ends of the high pressure turbine and the high pressure end of the low pressure turbine.

7. A turbine system comprising a high pressure turbine, an intermediate pressure turbine and a low pressure turbine, each of said turbines comprising a rotatable spindle provided with a blade portion and supported on bearings adjacent its ends; means for conducting steam through said turbines in series; sealing means for each of said spindles inwardly of said bearings; means for conducting leakage steam from an intermediate portion of the sealing means of the high pressure turbine to the steam inlet of the low pressure turbine; and means for conducting steam from a working area of the intermediate pressure turbine adjacent the exhaust thereof to at least one of the sealing means of the high pressure turbine outwardly of the said intermediate portion thereof.

JOHN R. HAGEMANN.